United States Patent
Chang

(10) Patent No.: US 7,898,784 B2
(45) Date of Patent: Mar. 1, 2011

(54) PROTECTION CIRCUIT WITH VARIABLE CURRENT LEVEL LIMITS

(75) Inventor: Yu-Yuan Chang, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 139 days.

(21) Appl. No.: 12/031,589

(22) Filed: Feb. 14, 2008

(65) Prior Publication Data

US 2009/0207545 A1 Aug. 20, 2009

(51) Int. Cl.
*H02H 9/08* (2006.01)
*H02H 3/22* (2006.01)

(52) U.S. Cl. .................................. 361/93.9; 361/111

(58) Field of Classification Search .............. 361/93.9, 361/111
See application file for complete search history.

(56) References Cited

U.S. PATENT DOCUMENTS

| 6,232,654 | B1 * | 5/2001 | Nagase ........................ 257/678 |
| 6,631,064 | B2 * | 10/2003 | Schuellein et al. ........... 361/93.1 |
| 7,079,368 | B2 * | 7/2006 | Ishikawa et al. .............. 361/93.1 |

FOREIGN PATENT DOCUMENTS

TW M250444 U 11/2004

* cited by examiner

*Primary Examiner* — Jared Fureman
*Assistant Examiner* — Lucy Thomas
(74) *Attorney, Agent, or Firm* — Muncy, Geissler, Olds & Lowe, PLLC

(57) ABSTRACT

A protection circuit with variable current level limits is coupled to between a power supply system and a load. The power supply system outputs power to drive the load. The protection circuit with variable current level limits of the present invention comprises: a current level limiting switch unit which is coupled to between the power supply system and the load to conduct the output power, a detection unit which detects the current value of the output power, a current level setting unit which sets a normal-state current level limit and a transient-state current level limit according to the current value of the output power, a current level setting unit which checks the current value of the output power and controls the current level limiting switch unit to limit the current value and a timer unit.

5 Claims, 2 Drawing Sheets

PROTECTION CIRCUIT WITH VARIABLE CURRENT LEVEL LIMITS

FIELD OF THE INVENTION

The present invention relates to a protection circuit with variable current level limits, particularly to a protection circuit, which provides different current level limits to protect the system under different states.

BACKGROUND OF THE INVENTION

At present, many electronic devices attain stale power supply from the conventional power supply device. When an electronic device is started up or hot-plugged, a very high surge appears, which may damage the elements of the electronic device or the power supply device. Many conventional technologies were developed to prevent the elements of the electronic device and the power supply device from being damaged by a surge, including: using the breaking of a switch element to block a surge, and using high voltage-withstand elements in the electronic device and the power supply device. A R.O.C. patent No. M250444 disclosed a "Surge-Inhibiting Power Source Protection Device", which comprises: a surge inhibitor, a control circuit and a high voltage detection circuit. The high voltage detection circuit detects the voltage of power supply and sends a detection signal to the control circuit when there is an abnormal voltage. The detection signal makes the control circuit stop sending a trigger signal to the surge inhibitor. Once the surge inhibitor does not receive the trigger signal, the surge inhibitor interrupts the electrical connection between the power source and the electronic device. The abovementioned technology is only one of the conventional methods to protect electronic devices from surge. However, a power source may be connected to various loads in different occasions and generate surges of different voltage levels. Thus, the conventional protection circuits, which have only one check value to determine whether there is a surge in the output power, may cause incorrect operations and result in that the electronic device cannot be driven normally. Therefore, the conventional protection circuits still have room to improve.

SUMMARY OF THE INVENTION

One objective of the present invention is provide a protection circuit with variable current level limits, which uses different current level limits to check and restrict the current levels in a normal state and a transient state to achieve the function of variable current level limits and prevent from incorrect operations.

The present invention proposes a protection circuit with variable current level limits, which is coupled to between a power supply system and a load. The power supply system outputs power to drive the load. The protection circuit with variable current level limits of the present invention comprises: a detection unit, a current level setting unit, a current level limiting switch unit and a timer unit. The current level limiting switch unit is arranged in the path where the power supply system outputs power to the load. The detection unit detects the current value of the output power. The current level setting unit is electrically coupled to the detection unit to acquire the current value and then sets a normal-state current level limit and a transient-state current level limit according to the current value of the output power. The current level setting unit is also electrically coupled to the timer unit. The timer unit has a delay timing. When the current value reaches the normal-state current level limit, the current level setting unit outputs a current level limiting signal to the current level limiting switch unit to make the current level limiting switch unit shift to have the resistance of the transient-state current level limit and change the current value of the output power. Then, the current level setting unit starts the delay timing and detects whether the changed current value is decreased to below the transient-state current level limit. If the changed current value is decreased to below the transient-state current level limit, the normal-state current level limit is restored. If the changed current value is not decreased to below the transient-state current level limit, the current level setting unit outputs a breaking signal to break the current level limiting switch unit and interrupt the output of power. Besides, the protection circuit with variable current level limits of the present invention can further has a power-on current level limit to inhibit a power-on surge at the instant that the load is started up or the instant that the power supply system is electrically coupled to the load. Via the abovementioned architecture, the protection circuit with variable current level limits of the present invention can provide sufficient protection for the power supply system, wherein the current level limiting switch unit can vary the limits of the current values of the output power according to the detection results of the detection unit, and wherein the current level limits dynamically vary in the normal state and the transient state to provide sufficient protection during a circuit abnormality.

DETAILED DESCRIPTION OF THE PREFERRED EMBODIMENTS

Below, the technical contents of the present invention will be described in detail in cooperation with the drawings.

Figure 1:
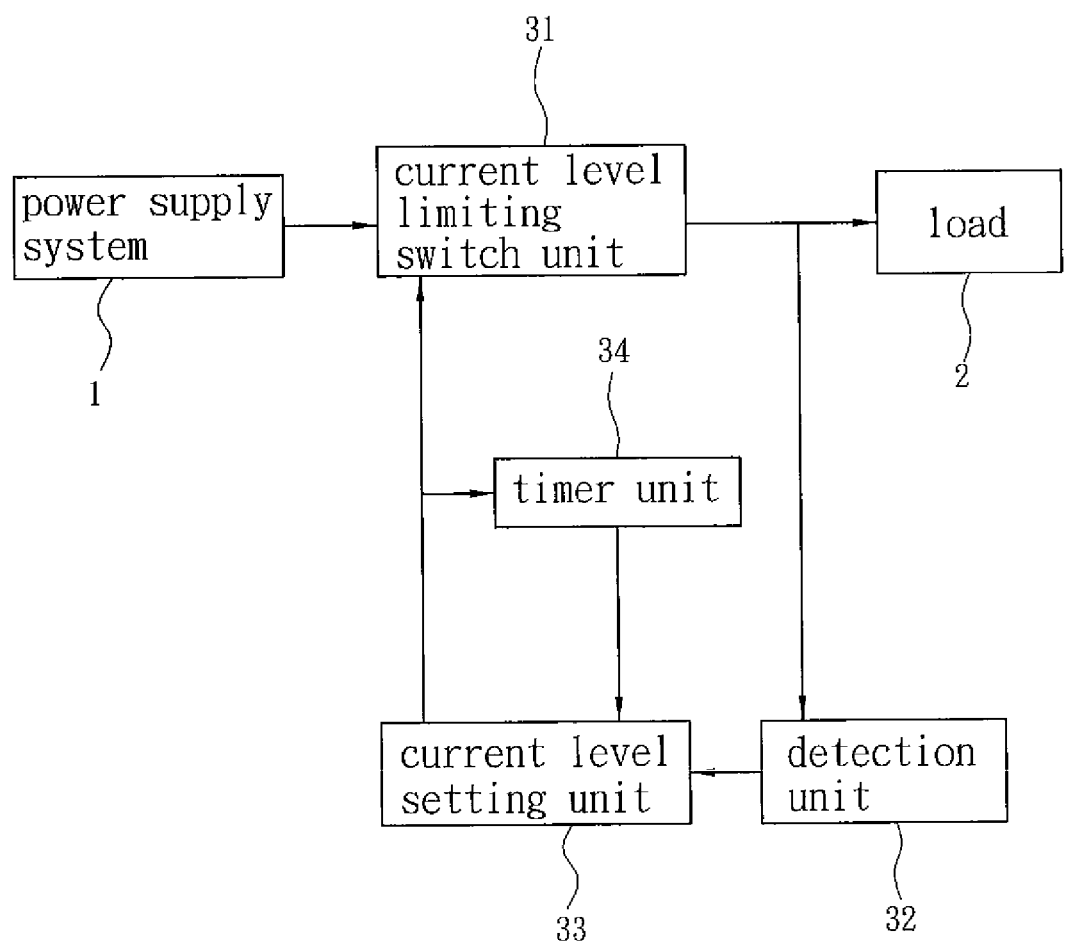
FIG. 1 is a diagram showing the architecture of the circuit according to the present invention.

Refer to FIG. 1. The present invention proposes a protection circuit with variable current level limits, which is coupled to between a power supply system 1 and a load 2 and is used to detect the power output by the power supply system 1 and inhibit the abnormality of the output power. The protection circuit with variable current level limits of the present invention comprises: a current level limiting switch unit 31, a detection unit 32, a current level setting unit 33 and a timer unit 34. The current level limiting switch unit 31 is coupled to between the power supply system 1 and the load 2 to conduct the output power. The detection unit 32 detects the current value of the output power. The current level setting unit 33 is electrically coupled to the detection unit 32 to acquire the current value and then sets a normal-state current level limit L1 and a transient-state current level limit L2 (shown in FIG. 2) according to the current value of the output power. The current value detected by the detection unit 32 is compared with the normal-state current level limit L1. The current level setting unit 33 is also electrically coupled to the timer unit 34. The timer unit 34 has a delay timing. When the current value reaches the normal-state current level limit L1, the current level setting unit 33 outputs a current level limiting signal to the current level limiting switch unit 31. Then, the current level limiting switch unit 31 is modulated to have the resistance of the transient-state current level limit L2 to change the current value. At the same time, the delay timing is triggered, and it is checked whether the changed current value is lower than the transient-state current level limit L2. If the changed current value is lower than the transient-state current level limit L2, the normal-state current level limit L1 is restored. If the changed current value is not lower than the transient-state current level limit L2, the current level setting unit 33 outputs a breaking signal to break the current level limiting switch unit 31 and interrupt the output of power. When the power supply system 1 and the load 2 operate normally, the current level setting unit 33 provides a higher normal-state current level limit L1. When the current value reaches the normal-state current level limit L1, it indicates that the output power is too great. Thus, the current level setting unit 33 begins to adopt the transient-state current level limit L2 and provides a current level limiting signal to control the current level limiting switch unit 31 to limit the current between the power supply system 1 and the load 2. At the same time, the timer unit 34 is triggered by the current level limiting signal to start the delay timing. Via the detection unit 32, the current level setting unit 33 detects whether the current value is decreased to below the transient-state current level limit L2 before the delay timing ends. If the current is not lower than the transient-state current level limit L2 when the delay timing ends, the current level setting unit 33 generates a breaking signal to break the current level limiting switch unit 31 to protect the power supply system 1 and the load 2. If the current is lower than the transient-state current level limit L2 when the delay timing ends, the current level setting unit 33 shifts the transient-state current level limit L2 to the normal-state current level limit L1 and restores the normal working state of the power supply system 1 and the load 2.

Figure 2:
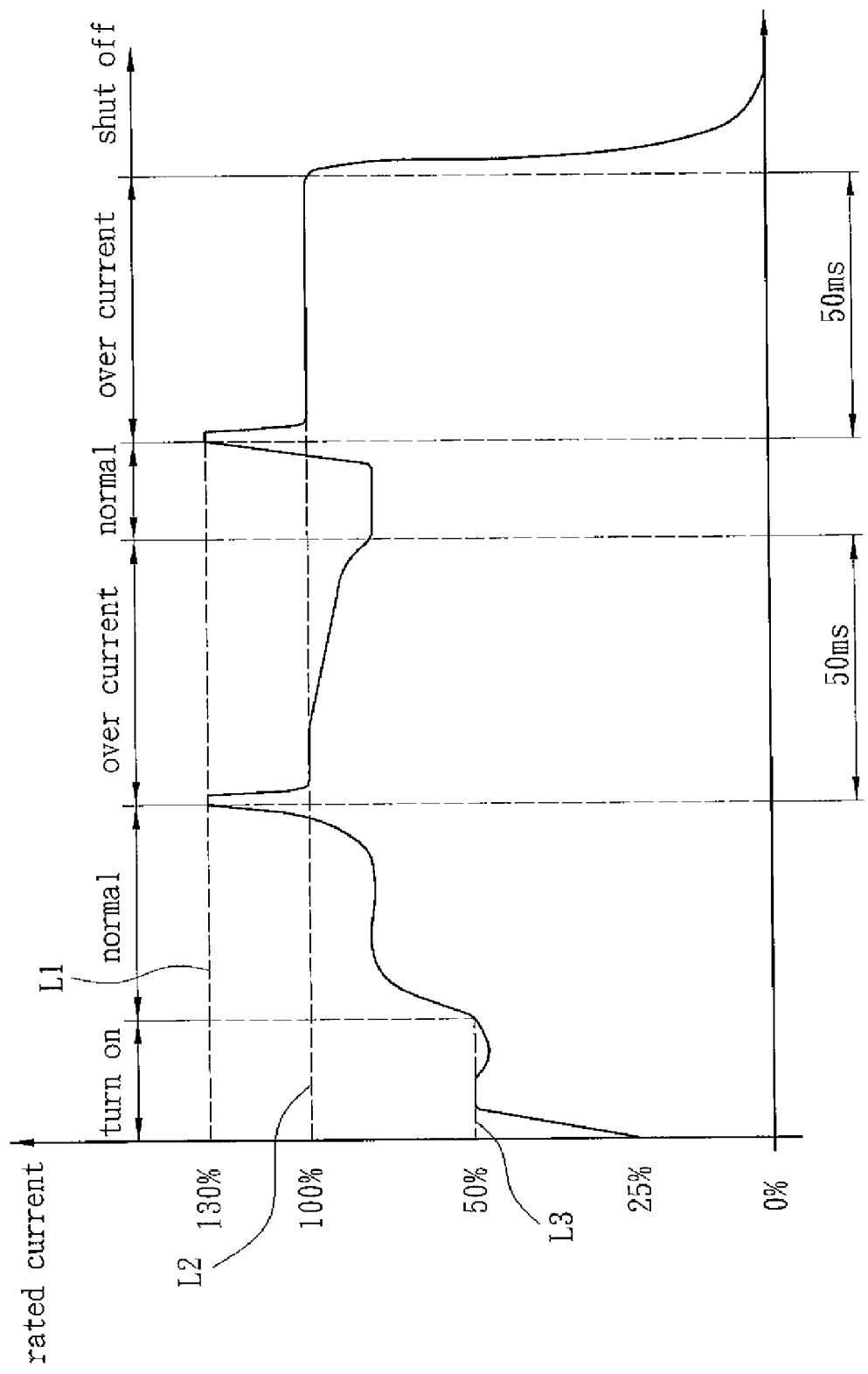
FIG. 2 is a diagram schematically showing the current values at different states according to the present invention.

Refer to FIG. 2 a diagram schematically showing the current values at different states. When the load 2 coupled to the power supply system 1 is just started or hot-plugged, there is none current flowing through the protection circuit. At this time, the protection circuit with variable current level limits of the present invention can further has a power-on current level limit L3, and the power-on current level limit L3 is set to be 50% of the rated current in this embodiment. When the detection unit 32 detects that none current passes, the current level limiting switch unit 31 has the resistance of the power-on current level limit L3. In other words, the power-on current level limit L3 makes the current level limiting switch unit 31 stay in a non-full conduction state when none current passes. After the startup or electrical connection of the power supply system 1 and the load 2, the current level limiting switch unit 31 is turned on, and the normal-state current level limit L1 is restored; in this embodiment, the normal-state current level limit L1 is set to be 130% of the rated current. When the output power has an abnormality and reaches the normal-state current level limit L1, the current level setting unit 33 shifts the normal-state current level limit L1 to the transient-state current level limit L2 having a lower current value; in this embodiment, the transient-state current level limit L2 is set to be 100% of the rated current. If the output power decreases within the delay timing provided by the timer unit 34, the normal-state current level limit L1 will be restored; in this embodiment, the delay timing is set to be 50 ms. If the output power does not decrease within the delay timing, the current level setting unit 33 generates a breaking signal to break the current level limiting switch unit 31 and cut off the electrical connection between the power supply system 1 and the load 2. Thus, the power supply system 1 and the load 2 are protected.

The abovementioned timer unit 34 may be a charge/discharge loop, wherein the charge time is used as the time interval of the delay timing, and the breaking signal is formed by the charge of the charge/discharge loop. Alternatively, the timer unit 34 may be a digital counter. Besides, the detection unit 32, current level setting unit 33 and timer unit 34 may be arranged on a printed circuit board and then coupled to the power supply system 1.

The preferred embodiments described above are only to exemplify the present invention but not to limit the scope of the present invention. Any equivalent modification or variation according to the spirit of the present invention is to be also included within the scope of the present invention, which is based on the claims stated below.

In conclusion, the present invention has achieved the abovementioned improvements over the conventional technologies and fully met the conditions of novelty and non-obviousness for a patent. Thus, the Inventors file the application for a patent. It will be appreciated if the patent is approved fast.

What is claimed is:

1. A protection circuit with variable current level limits, which is coupled between a power supply system and a load and is used to detect power output by said power supply system and limit current output by said power supply system, comprising:

a current level limiting switch unit, arranged in an electrical path between an output of said power supply system and said load;

a detection unit, detecting a current value of said power;

a current level setting unit, electrically coupled to said detection unit to acquire said current value, setting a normal-state current level limit and a transient-state current level limit according to said current value, also electrically coupled to a timer unit having a fixed delay timing, outputting a current level limiting signal to said current level limiting switch unit to make said current level limiting switch unit modulate to have a resistance of said transient-state current level limit and change said current value of said power when said current value reaches said normal-state current level limit, starting said fixed delay timing when said current level limiting signal is outputted and detecting whether said changed current value is decreased to below said transient-state current level limit within said fixed delay timing, restoring said normal-state current level limit if changed said current value is decreased to below said transient-state current level limit, outputting a breaking signal to break said current level limiting switch unit and interrupt output of said power if changed said current value is not decreased to below said transient state current level limit.

2. The protection circuit with variable current level limits according to claim 1, wherein said timer unit is a charge/discharge loop, and a charge time of said charge/discharge loop is used as a time interval of said delay timing.

3. The protection circuit with variable current level limits according to claim 1, wherein said timer unit is digital counter.

4. The protection circuit with variable current level limits according to claim 1, wherein said detection unit, said current level setting unit and said timer unit are arranged on a printed circuit board and then coupled to said power supply system.

5. The protection circuit with variable current level limits according to claim 1 further having a power-on current level limit.

* * * * *